United States Patent
Bajgrowicz

(10) Patent No.: US 7,607,155 B2
(45) Date of Patent: Oct. 20, 2009

(54) VERIFYING 22 KHZ TONE OPERATION IN A SET-TOP BOX

(75) Inventor: Brian David Bajgrowicz, Marion, IN (US)

(73) Assignee: Thomson Licensing, Boulogne Billancourt (FR)

( * ) Notice: Subject to any disclaimer, the term of this patent is extended or adjusted under 35 U.S.C. 154(b) by 301 days.

(21) Appl. No.: 10/592,224

(22) PCT Filed: Aug. 13, 2004

(86) PCT No.: PCT/US2004/026213

§ 371 (c)(1),
(2), (4) Date: Sep. 8, 2006

(87) PCT Pub. No.: WO2005/094212

PCT Pub. Date: Oct. 13, 2005

(65) Prior Publication Data

US 2007/0136764 A1    Jun. 14, 2007

Related U.S. Application Data

(60) Provisional application No. 60/551,435, filed on Mar. 9, 2004.

(51) Int. Cl.
*H04N 7/20* (2006.01)
(52) U.S. Cl. .......................................... 725/72
(58) Field of Classification Search ................. 375/316; 348/180, 725
See application file for complete search history.

(56) References Cited

U.S. PATENT DOCUMENTS

| | | | | |
|---|---|---|---|---|
| 6,137,549 A * | 10/2000 | Rasson et al. | ................. | 725/37 |
| 6,151,479 A | 11/2000 | Kummer | | |
| 6,421,742 B1 * | 7/2002 | Tillier | ........................... | 710/1 |
| 6,430,233 B1 * | 8/2002 | Dillon et al. | ................. | 375/316 |
| 6,944,878 B1 | 9/2005 | Wetzel et al. | | |
| 7,130,576 B1 * | 10/2006 | Gurantz et al. | ............. | 455/3.02 |
| 2003/0050015 A1 * | 3/2003 | Kelly et al. | ................. | 455/67.4 |
| 2004/0028149 A1 * | 2/2004 | Krafft et al. | ................. | 375/316 |
| 2004/0058642 A1 * | 3/2004 | Merio | ........................ | 455/3.02 |
| 2005/0009481 A1 * | 1/2005 | Bushner | ..................... | 455/132 |

FOREIGN PATENT DOCUMENTS

WO    WO/99/41905    8/1999

OTHER PUBLICATIONS

Search report dated Sep. 25, 2005.

* cited by examiner

*Primary Examiner*—Brian T Pendleton
*Assistant Examiner*—Cai Chen
(74) *Attorney, Agent, or Firm*—Robert D. Shedd; Robert B. Levy; Jeffrey D. Hale

(57) ABSTRACT

A set top box (100) arrangement includes transmitting circuitry (104) for transmitting a message and an emulated reply to the message, and receiver circuitry (105) for receiving the control message and comparing the control message to the emulated reply to the message. The transmitted message and emulated reply message are each a digital satellite equipment control message. The emulated reply message that was received is compared with the reply that was transmitted to verify 22 kHz tone operation of a low noise block downconverter power supply.

3 Claims, 2 Drawing Sheets

US 7,607,155 B2

VERIFYING 22 KHZ TONE OPERATION IN A SET-TOP BOX

This application claims the benefit, under 35 U.S.C. § 365 of International Application PCT/US2004/026213, filed 13, Aug. 2004, which was published in accordance with PCT Article 21(2) on 13, Oct. 2005 in English and which claims the benefit of United States provisional patent application No. 60/551,435, filed 9 Mar. 2004.

FIELD OF THE INVENTION

The present invention relates generally to satellite communications and, more particularly, to verifying 22 kHz tone operation of a satellite set-top box.

DESCRIPTION OF THE RELATED ART

The open standard Digital Satellite Equipment Control (DiSEqC) relies on switching a 22 kHz tone rapidly on and off. In this way, a specially designed receiver can communicate to and control numerous devices that it may be connected to such as a low noise block downconverter (LNB). DiSEqC messages are sent as sequences of short bursts of 22 kHz tone modulated on the LNB power supply carried by the coax cable from the input on the receiver (the master) to the LNB and/or other devices. Messages comprise a number of digital bytes of nine bits each (8 bits of data+1 odd parity bit). Each bit occupies a specific time and the proportion of that time filled with the 22 kHz burst determines whether that bit is a 1 or a 0. It is a simple pulse-width modulation scheme.

The DiSEqC system has been designed primarily to meet the problem of multi-satellite and/or multi-band systems with ease. It has commands for switching between inputs, changing frequencies within devices, and many others as well as allowing for custom commands to be used in systems.

The first byte of the DiSEqC protocol is the Framing byte. The first five bits of this byte follow the pattern, '11100' to allow listening devices (slaves) to synchronize to the signal. Some of the bit definitions may change with later versions of DiSEqC and also allow for custom data definitions to be used. The sixth bit is set to '0' if the message is a command from the master or '1' if it's a reply from a slave. Bit seven is set to '1' if a response is required or '0' if not. The last framing bit signals whether this message is a re-transmission of a message for which a reply has not been received. The second byte indicates which family of devices the message is for. The first half (four bits) indicates the type of device (LNB, switch, positioner, etc) and the second half the particular type. In each half of this Address byte a value of '0' means the message is open to all. Next comes the Command byte. This actually tells the listening devices what to do. This is followed by a number of Data bytes to pass on numbers relevant to the command (such as the angle required from a separate polarizer).

For control of simple switches which do not necessarily need to support the full DiSEqC protocol extension to the protocol known as tone burst is used. A 12.5 ms burst of continuous 22 kHz tone is used to select position 'A' on the switch and a sequence of nine DiSEqC '1' bits is used to select position 'B'.

While trying to trouble shoot an installation of a user's set-top box, it would be helpful in narrowing some problems down if some of the set-top box hardware could perform a self-test procedure. Simple detection circuits consisting of only one or two transistors and a few discrete components can be implemented to perform this test. This additional circuitry adds cost and could fail itself and falsely indicate a problem with the set-top while the set-top's LNB supply is actually operating correctly.

Accordingly, there is a need for determining whether or not the 22 kHz portion of a set-top box's LNB power supply is functioning properly and within specifications without needing any additional hardware to do so.

SUMMARY OF THE INVENTION

A set top box arrangement includes transmitting circuitry for transmitting a message, and receiver circuitry for receiving the control message and comparing the control message to the transmitted message. The transmitted message is a digital satellite equipment control message.

In an alternative embodiment, a set top box arrangement includes transmitting circuitry for transmitting a message; an input terminal controlled for emulating a reply to the message transmitted, and circuitry for comparing the reply emulated with the message received.

A method for verifying 22 kHz tone operation in a satellite set top box includes the steps of sending a digital satellite equipment control message with a transmitter; changing control of the transmitter over to a controlled input pin, pulsing the input pin to send an emulated reply to the control message, and comparing the emulated reply to the received reply to verify operation.

BRIEF DESCRIPTION OF THE DRAWINGS

A more complete understanding of the present invention may be obtained from consideration of the following description in conjunction with the drawings, in which.

DETAILED DESCRIPTION

As part of a satellite set-top box, the LNB power supply may include the generation of a 22 kHz tone or a pulse-width modulated 22 kHz tone for communication to the LNB or other peripherals, such as a multi-switch, that may be connected to the set-top box. This invention allows the set-top box to determine if this 22 kHz portion of the set-top's LNB power supply is functioning properly using hardware already in the set-top that is being used for the communication to and from the LNB and/or peripherals The invention is a methodology for determining whether or not the 22 kHz portion of a set-top's LNB power supply is functioning properly and within specifications without needing any additional hardware to do so.

Figure 1:
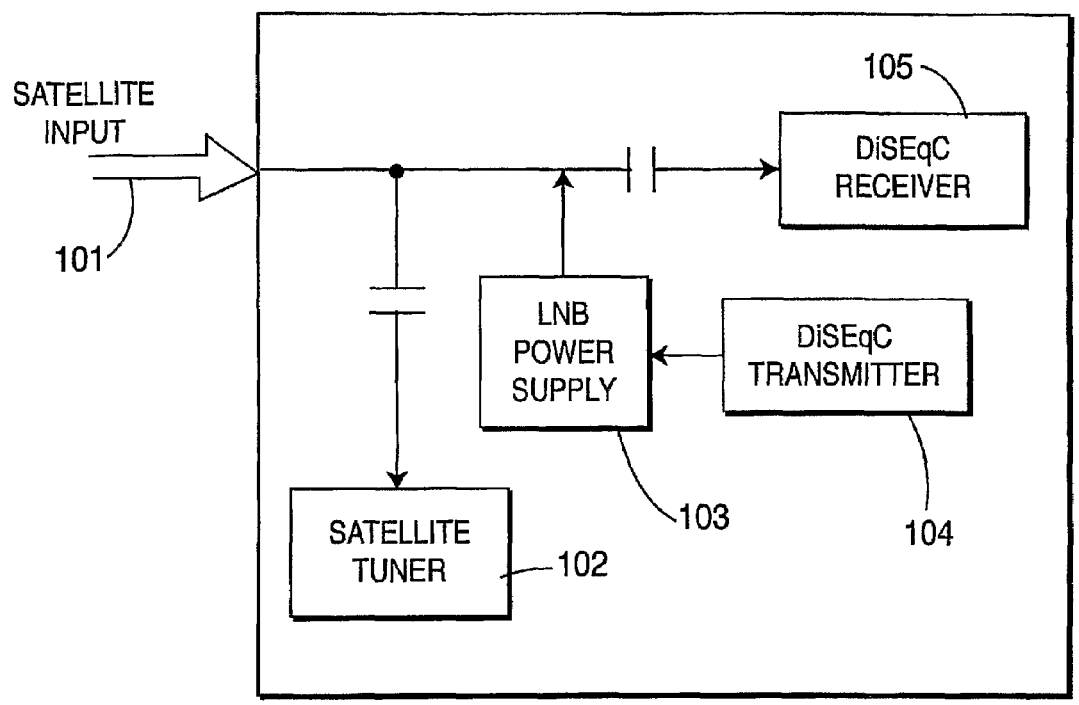
FIG. 1 is a block diagram of an exemplary satellite set-top box front end arrangement for carrying out the invention.

FIG. 1 shows a block diagram 100 for a typical front-end configuration of a satellite set-top box (STB). The Satellite signal is brought from the outdoor unit (ODU) (not shown) consisting of the LNB and/or multi-switches and/or other accessories to the satellite input 101 of the STB via coaxial cable. The radio frequency (RF) signal is passed to the satellite tuner 102. The 22 kHz tone and/or DiSEqC messages are passed to the DiSEqC receiver 105. The tone shows up at the DiSEqC receiver 105 regardless of whether it originates in the LNB power supply or in the ODU. The LNB power supply 103 is responsible for passing DC and control signals to the ODU via the same coaxial cable that is bringing the radio frequency RF signal to the STB. The control signal could consist of DiSEqC messages or some similar pulse-width modulated messaging scheme or continuous tone.

When it becomes necessary to diagnose a problem as to why satellite signals are not getting to the STB, many things could be wrong. It could be anything from a loose connection or broken cable to a problem with the circuitry in the STB. Testing the 22 kHz to verify that this portion of the LNB power supply is operating properly helps to narrow the problem down and possibly prevent "fixing" the wrong problem. This can be accomplished with a small circuit designed specifically for this purpose consisting of a few transistors and a few discrete parts. However, if the STB already has the circuitry to implement DiSEqC 2.x (bi-directional) for ODU control, this existing circuitry can be used to verify that the 22 kHz tone portion of the LNB power supply is operating properly. The 22 kHz can be verified by using the transmitting circuitry of the DiSEqC transmitter 104 to not only transmit an original DiSEqC message, but to emulate the reply that would happen from a device on the DiSEqC bus such as an LNB or multi-switch. Depending on the design of the LNB supply and DiSEqC circuitry, it may be possible for the receiving portion of the circuit to "receive" exactly what is being transmitted. The received data can then be compared to the transmitted data and the 22 kHz operation verified. If the DiSEqC circuitry and the LNB supply are designed in such a way as to not allow the receiver portion to "receive" exactly what is being transmitted (i.e. ignore what's being sent), then the 22 kHz can be verified by emulating a reply on the bus. This can be done by "bit banging" the reply through the LNB power supply by using a general-purpose input/output (GPIO) pin under software control in the STB to create the DiSEqC message. The received data can then be compared to the expected emulated reply to verify the 22 kHz tone.

Some other things can come into play. The 22 kHz tone from the STB must have sufficient amplitude to control the ODU properly. This may be different from what is normally expected on the DiSEqC bus. It may be possible to verify the amplitude also, given that the design of the DiSEqC receiver allows for adjustments to the amplitude threshold. There can be some problems that arise in testing the 22 kHz with the emulated reply. There may be devices on the DiSEqC bus that actually reply to the original transmitted signal. If the format and timing of the reply are proper and expected, this too will verify that the transmission of the 22 kHz is working properly. However, if the reply isn't exactly what is expected, then the emulated reply would be needed to truly verify that the 22 kHz tone is operating properly. The emulated reply, however, could "contend" with the reply from the ODU on the bus and both messages could be compromised. This contention can be eliminated with careful choice of the original transmitted DiSEqC message. For example, the original transmitted DiSEqC command can be the "sleep" command. This would then put all devices on the bus into sleep mode and they would not respond to further commands until they received the "awake" command. The "awake" command would have to be transmitted after the test was completed so that the devices on the DiSEqC bus would resume proper operation. Another example on how to avoid bus contention would be to send a DiSEqC command for which a reply is not expected. A "reset" command would be an example of such a command. One other example of trying to avoid bus contention would be to make the original transmitted command be an "unknown" command. For example, the first nibble of a proper DiSEqC message always consists of the binary bits '1', '1', '1', '0'. Thus an unknown command would have the first nibble consist of a bit pattern, which does not match this pattern.

Figure 2:
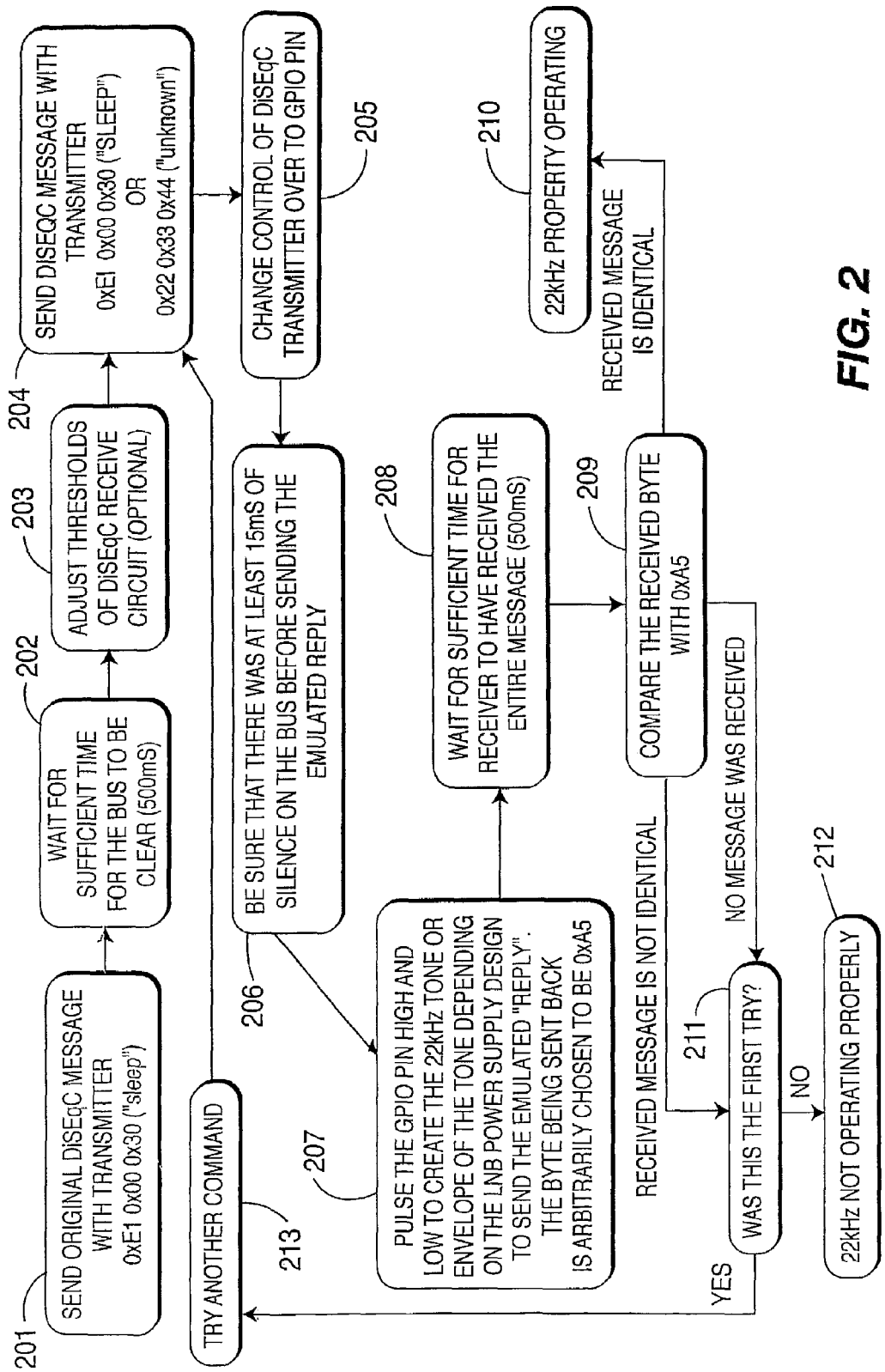
FIG. 2 is a block diagram of an exemplary method for verifying 22 kHz tone operation in accordance with the invention.

FIG. 2 is a flow chart 200 example of how to verify the 22 kHz tone by receiving an emulated reply. The bold text in the chart gives the hexadecimal commands being sent on the DiSEqC bus. The original DiSEqC message is sent with the transmitter 201 followed by a sufficient waiting period for the bus to clear itself 202. This first message is sent to really just clear the bus to a known state and is optional. At this point, the voltage thresholds of the DiSEqC receiver circuit can be adjusted 203 if such a control exists. This step is also optional. The DiSEqC message is then sent with the transmitter 204. Control of the DiSEqC transmitter is changed over to the general-purpose input/output (GPIO) pin 205. At least 15 milliseconds of silence on the bus is needed before sending the emulated reply 206.

The GPIO pin is pulsed high and low to create the 22 kHz tone or envelope of the 22 kHz tone depending on the LNB power supply design to send an emulated "reply" 207. The byte being sent back is arbitrarily chosen to be a certain byte sequence plus the appropriate odd parity bit, i.e., 0xA5+'1'. Sufficient time for the receiver to have received the entire message is allowed 208. The received byte is compared with the expected byte sequence, 0xA5+'1', 209. If the received message is identical to the expected byte sequence then the 22 kHz tone is operating properly 210. If either the received message is not identical or if no message was received, and the comparison 209 was the first try, then another command is sent 213. If the comparison test was not a first try then the 22 kHz tone is not operating properly 212. The number of retries is arbitrary and is chosen based upon the probability of bus collision and/or user preference.

Although various embodiments which incorporate the teachings of the present invention have been shown and described in detail herein, those skilled in the art can readily devise many other varied embodiments that will still incorporate these teachings.

The invention claimed is:

1. A set top box arrangement comprising:
   transmitting circuitry for transmitting a message and an emulated expected reply comprising a reply that would be expected in response to the message transmitted;
   and receiver circuitry for receiving the message and comparing the received message to the emulated expected reply;
   a low noise block LNB downconverter power supply operating with a 22 kHz tone;
   wherein at least said message transmitted and the emulated expected reply are each a digital satellite equipment control message for verifying operation of the 22 kHz tone operation of the LNB power supply.

2. The set top box arrangement of claim 1, wherein at least the message transmitted is a 22 kHz digital satellite equipment control message.

3. A set top box arrangement comprising:
   transmitting circuitry for transmitting a message;
   an input terminal controlled for emulating a reply that would be expected in response to the message transmitted;
   circuitry for receiving a message;
   and circuitry for comparing the emulated expected reply with the message received
   wherein at least the message transmitted and emulated expected reply are each a 22 kHz digital satellite equipment control message.

* * * * *

UNITED STATES PATENT AND TRADEMARK OFFICE
CERTIFICATE OF CORRECTION

PATENT NO.        : 7,607,155 B2                                                Page 1 of 1
APPLICATION NO.   : 10/592224
DATED             : October 20, 2009
INVENTOR(S)       : Brian David Bajgrowicz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 343 days.

Signed and Sealed this

Twelfth Day of October, 2010

David J. Kappos
*Director of the United States Patent and Trademark Office*